May 4, 1965
L. L. LIGGIO
3,181,238
PISTOL GRIP PIPE CUTTER
Filed May 23, 1963
3 Sheets-Sheet 1
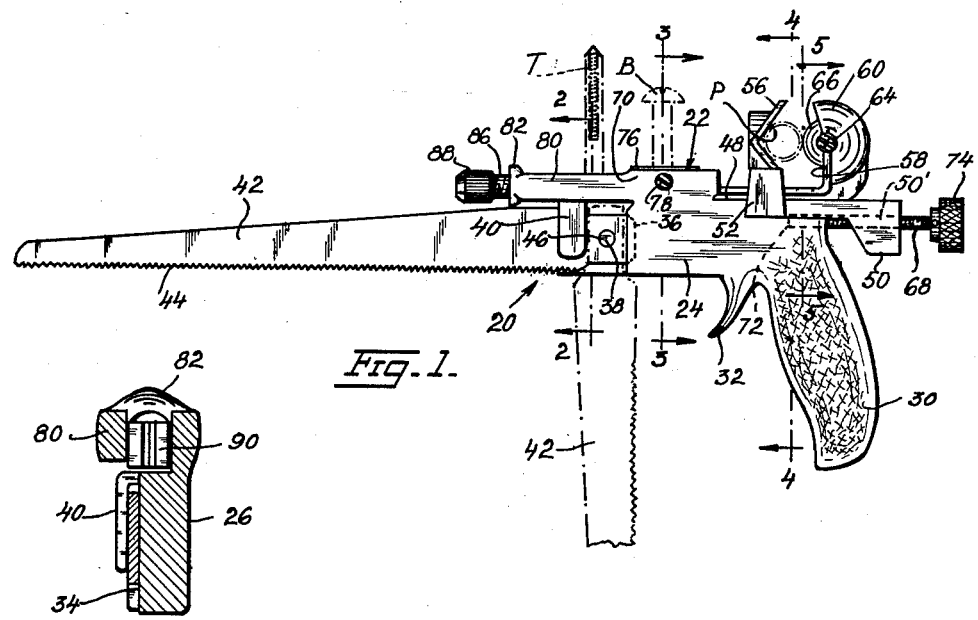
Fig. 1.
Fig. 2.
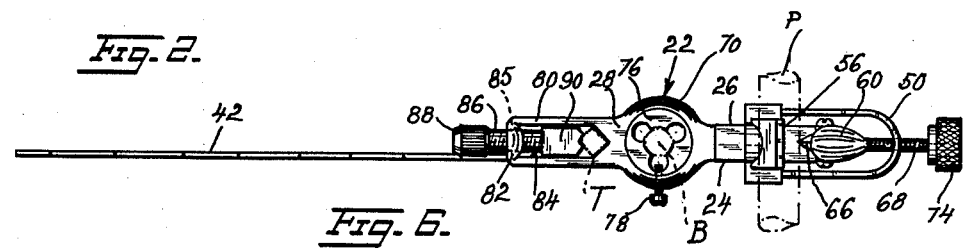
Fig. 6.
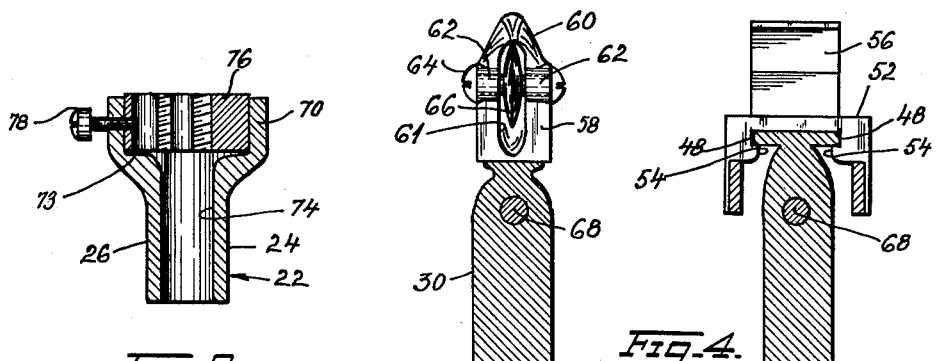
Fig. 3.
Fig. 5.
Fig. 4.
INVENTOR.
Leo Luca Liggio
BY Polachek & Saulsbury
ATTORNEYS.

May 4, 1965 L. L. LIGGIO 3,181,238
PISTOL GRIP PIPE CUTTER
Filed May 23, 1963 3 Sheets-Sheet 2
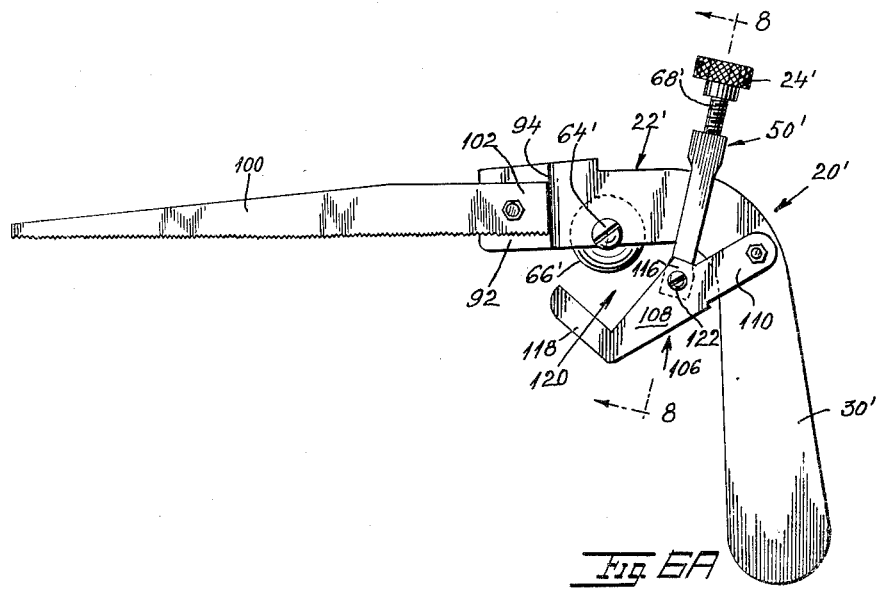
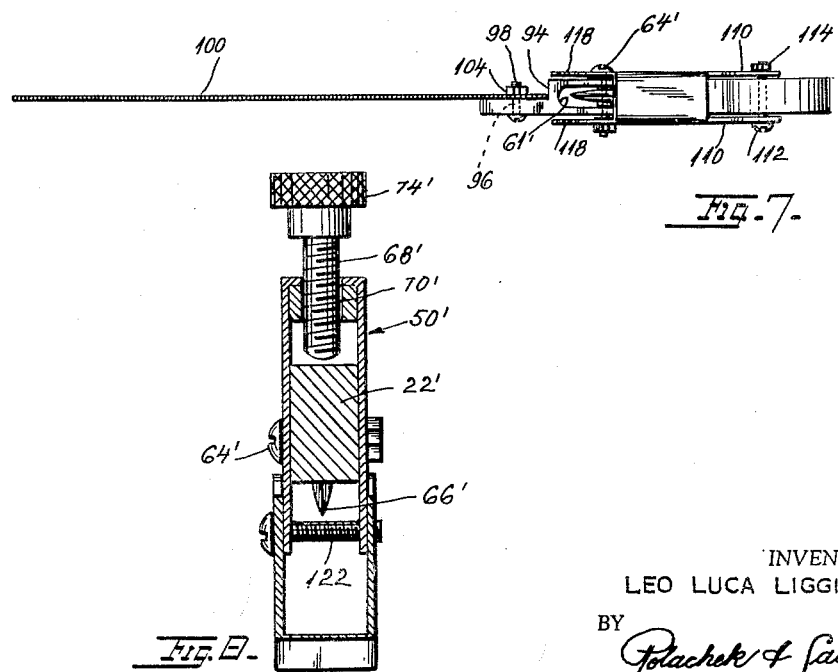
INVENTOR.
LEO LUCA LIGGIO
BY
Polachek & Saulsbury
ATTORNEYS May 4, 1965  L. L. LIGGIO  3,181,238
PISTOL GRIP PIPE CUTTER Filed May 23, 1963  3 Sheets-Sheet 3

INVENTOR.
LEO LUCA LIGGIO
BY Polachek & Saulsbury
ATTORNEYS

United States Patent Office 3,181,238
Patented May 4, 1965

3,181,238
PISTOL GRIP PIPE CUTTER
Leo Luca Liggio, 83 Cox Ave., Yonkers, N.Y.
Filed May 23, 1963, Ser. No. 282,791
1 Claim. (Cl. 30—94)

This invention relates generally to the art of tools and more particularly to a combination hand tool assembly.

Broadly, the invention comprises a combination hand tool assembly comprising a pistol type body supporting an elongated removable toothed blade, a round rollable cutting wheel and sockets for various other tools.

A principal object of the present invention is to provide a combination hand tool assembly that is convertible from one type of hand tool to another type of hand tool.

Another object of the invention is to provide a combination hand tool assembly that is convertible from a saw type of hand tool to a tap or threader type of hand tool.

A further object of the invention is to provide a tool assembly or combination tool including a handsaw with a pipe cutter or pipe cutters mounted on the back of the saw.

Still another object of the invention is to provide a hand tool assembly including a saw with means for mounting a tap and die on the back of the saw.

Yet another object of the invention is to provide a hand saw with novel blade mounting means.

For further comprehension of the invention and of the objects and advantages thereof, reference will be had to the following description and accompanying drawings and to the appended claim in which the various novel features of the invention are more particularly set forth.

In the accompanying drawings forming a material part of this disclosure.

FIG. 1 is a side elevational view of a combination hand tool assembly embodying one form of the invention, the blade being shown in moved adjusted position in dot-dash lines, a pipe being shown in dot-dash lines, and various tools being shown in dot-dash lines.

FIG. 2 is an enlarged cross-sectional view taken on the line 2—2 of FIG. 1.

FIG. 3 is a cross-sectional view taken on the line 3—3 of FIG. 1.

FIG. 4 is a cross-sectional view taken on the line 4—4 of FIG. 1.

FIG. 5 is a cross-sectional view taken on the line 5—5 of FIG. 1.

FIG. 6 is a top plan view thereof.

FIG. 6A is a side elevational view of a combination hand tool assembly embodying a modified form of the invention.

FIG. 7 is a top plan view thereof.

FIG. 8 is a cross-sectional view taken on the line 8—8 of FIG. 6.

Figure 9:
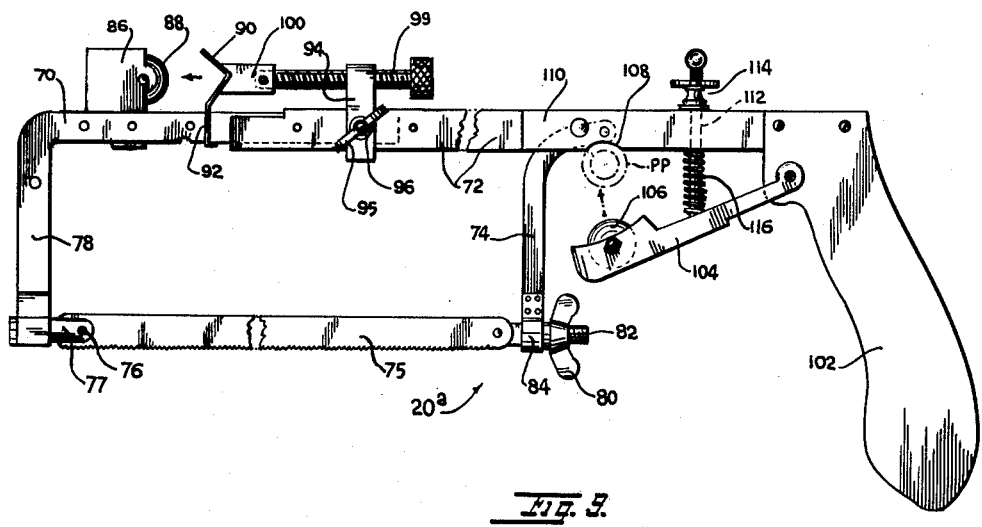
FIG. 9 is a side elevational view of a combination hand tool assembly embodying another modified form of the invention, parts being shown broken away.

Referring in detail to the drawings and more particularly to FIGS. 1 to 5, inclusive, a combination hand tool assembly embodying one form of the invention is shown in FIG. 1 and designated generally by the reference numeral 20.

The tool assembly 20 comprises a rectangular-shaped solid metal body 22 with flat sides 24, 26 and flat top edge 28. At one end piston shaped grip or handle 30 is formed integrally and extends angularly downwardly as viewed in FIG. 1. A curved finger 32 is formed on the bottom edge of the body adjacent the hand grip in simulation of a trigger.

The body at one side, the side 24 at the end thereof is cutaway as indicated at 34 and a vertical groove 36 is formed in the inner end edge wall of the cutaway portion 34. An integral pin 38 protrudes outwardly from the center of the cutaway portion and a plate-like lug 40 is formed on the outer end of the cutaway portion and closely spaced from the surface of the cutaway portion.

An elongated metal tapering blade 42 with teeth 44 along one long edge and with a hole 46 adjacent a reduced end thereof at its center is pivotally and removably mounted on the pin 38 and guided in its movements by the lug 40. In mounting the blade, the reduced end thereof is disposed vertically as shown in dot-dash lines in FIG. 1 and its hole placed over the pin 38. The blade is then swung lateraly to the left underneath the lug 40. The lug 40 steadies the blade during the cutting operations.

The body 20 along its top edge above the pistol grip 30 is formed with opposed grooves 48 extending lengthwise therealong. A yoke member having a U-shaped body 50 is slidably mounted on the body 20 at the top thereof. An inverted U-shaped bridge member 52 is formed and carried on the forward end of the yoke member. The bridge member is formed with opposed inwardly extending rails 54 which ride in the grooves 48 to guide the yoke member in its inward and outward movements. A V-shaped anvil 56 is formed integrally on the top of the bridge member 52, the anvil opening horizontally and rearwardly.

On the end of the body 20 above the pistol grip 30, the body is formed with an upturned plate 58 facing the anvil 56. The plate 58 is formed with an integral bulbous shaped semi-circular metal housing 60. The plate is slotted at its center as indicated at 61, intersecting its top end and journalled in bearings 62 on the top of the plate on the sides of the slot there is a stub shaft 64. A circular cutting wheel 66 is mounted on the shaft and is disposed in the slot in the plate, and is shielded by the bulbous housing 60. The cutting wheel is disposed on a vertical plane intersecting the plane of the anvil 56. An elongated threaded bolt 68 extends through a longitudinally extending threaded bore 50 in the downwardly extending bight portion at the rear end of the yoke member with its inner end journalled in a hole 72 in the end of the body 20 above the grip 30. A knurled knob 74 is secured to the other outer end of the bolt for turning the same. When the bolt is turned, the yoke member 50 with its anvil 56 is moved toward and away from the cutting wheel 66.

Intermediate the ends of the body 22, a circular enlargement 70 is formed on the top thereof. The enlargement is formed with a countersunk recess 73, the recess communicating with a vertically disposed passage 74 formed in the body centrally of the recess. A circular internally threaded die member 76 is removably seated in the recess 73 and is held in place by a set screw 78 projecting through the wall of the recess.

The forward end of the body 22 is formed with an extension 80 having an enlarged rounded terminal 82 and a slot 84 centrally thereof. The inner edge wall of the slot is curved. The terminal 82 is formed with a threaded bore 85. A threaded bolt 86 extends through the bore 85 and has a knurled knob 88 on the outer end thereof and a clamping head 90 on the inner end thereof, movable along the slot 84.

In use, the pistol grip handle 30 and finger piece 32 may be gripped by the hand and finger of the operator for actuating the saw blade 42.

A pipe P is positioned between the anvil 56 and the cutting wheel 66 and the bolt 68 turned to clamp the pipe between the anvil and the cutting wheel. The pipe P will be held stationary in a suitable vise (not shown). The tool assembly can then be rotated around the pipe while wheel 66 cuts the pipe. Bolt 68 can be tightened after each turn of the tool assembly around pipe P to keep the cutting edge of the cutting wheel in contact with the pipe until the pipe is cut through.

The shank of a bolt B or the like may be inserted through the die member 76 and external threads will be formed thereon when the tool assembly is rotated, the shank progressively moving through the passage 74 in the body 22.

A tap T may be inserted upright in the end of slot 84 in the extension 80 of the body 22 and by turning the knob 88 the pipe will be clamped between the head 90 and the end edge wall of the slot 84 for any desired operation thereupon.

In FIGS. 6A, 7 and 8, another modified form of combination hand tool assembly 20' is shown. This form of tool assembly 20' includes a body 22' and a pistol grip 30'. The body is formed of solid metal and is substantially rectangular in configuration and in cross-section. The pistol grip 30' extends angularly from one end of the body. The free end of the body 22' is reduced in thickness forming a recess 92 and a transverse shoulder 94 on the body. A hole 96 is formed in the center of the recessed portion 92 to receive a screw 98. An elongated tapering flat blade 100 is formed with a hole in its wide end 102 adapted to be placed over the screw 98 and to be removably held thereon by a nut 104 whereby the blade forms an extension of the body 22'.

In accordance with the invention, the body 22' midway its ends is formed with a recess 61' intersecting the bottom edge thereof. A shaft 64' extends across the recess and is supported by the walls thereof. A cutting wheel 66' is rotatably mounted on the shaft 64 with a portion of its periphery extending outwardly of the bottom of the body.

A channel-shaped yoke member 106 is pivotally connected to the assembly at the juncture between the body 22' and the pistol grip 30'. The yoke member includes a channel-shaped body 108 formed at one end with a pair of arm members 110 forming extensions thereof and secured to the pistol grip 30' by a bolt 112 and nut 114. The body at its center is formed with a triangular shaped enlargement 116, at each side and at its other end is formed with a pair of angularly disposed fingers 118, the angularity of the edges of the fingers and of the edges of the triangular enlargement defining a triangular space 120.

Another elongated inverted U-shaped yoke member 50' is pivotally connected to the apical end of the triangular shaped enlargement 116 of the channel-shaped body 108 by means of a pivot pin 122. An elongated set screw 68' extends through a threaded hole 70' in the bight portion of the yoke member. A knurled knob 74' is mounted on the outer end of the screw and the inner end thereof is adapted to engage the top of the body 22' for holding the channel-shaped body 108 in moved adjusted position. The triangular space 120 formed by the channel shaped body 108 is opposed to the protruding periphery of the cutting wheel 66'.

In using the combination hand tool assembly 20', the pistol grip 30' serves as a handle for manipulating the saw blade 100. A pipe or the like (not shown) may be inserted in the space 120 between the cutting wheel 66' and the channel-shaped yoke member 106, the yoke member 106 being clamped around the pipe by swinging the yoke member 50' and holding the yoke member in swung position by means of the set 68'. The pipe will be held by a vise or the like (not shown) and the tool assembly 20' will be rotated for cutting the pipe.

In FIG. 9 there is shown another modified form of tool assembly 20ª. This tool assembly has an L-shaped frame 70 which is adjustably engaged with a frame back 72. The frame back carries a depending bar 74 defining a support for one end of a hacksaw blade 75. The other end of the blade is engaged on a pin 76 carried by lug 77 at the lower end of frame section 78. The blade is tightened by a wingnut 80 engaged on threaded end of a shaft 82 passing through a collar 84 at the end of bar 74.

On frame 70 there is secured a wheel guard 86 carrying a rotatable pipe cutter wheel 88. An anvil 90 has depending legs 92 astride frame 70 and slidable thereon. A post 94 is secured to frame back 72 by a wingnut 95 and bolt 96. The post 95 has an internal thread in which is engaged bolt 99. The forward end of the bolt is rotatably engaged in anvil extension 100. When the bolt is turned the anvil can advance toward the pipe cutter wheel 88 for cutting a pipe therebetween. The handle 102 at the rear end of the tool assembly can be grasped for turning the tool on the pipe as wheel 88 cuts the stationary pipe.

A channel-shaped arm 104 is pivotally secured to the forward end of handle 102. At its forward end, the arm 104 carries a rotatable pipe cutter wheel 106. The pipe PP can be engaged between this wheel and a recess 108 formed in the underside of the back 72. The arm 104 can be retracted toward the back 72 by a bolt 110 attached to the arm and passing through a hole 112 in the back. A nut 114 is engaged on the bolt for retracting the same when the nut is turned. A coil spring 116 on the bolt keeps the arm biased outwardly of the back 72.

Figure 10:
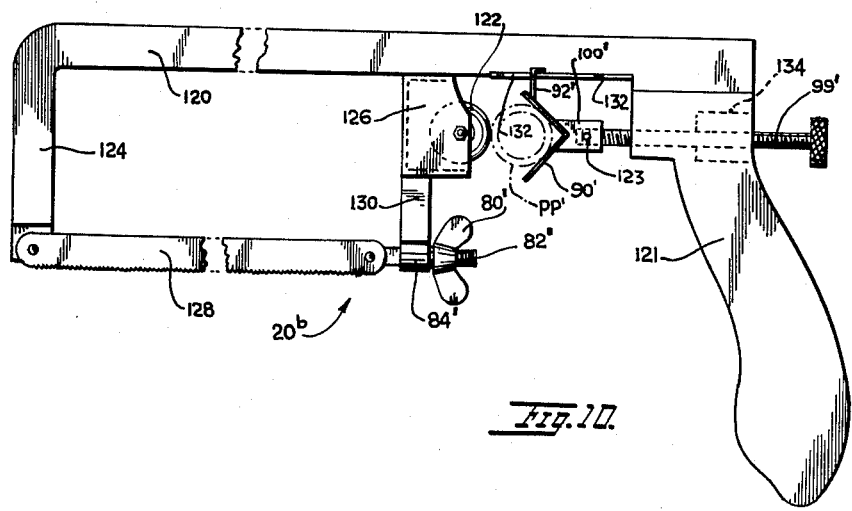
FIG. 10 is a side elevational view of a combination hand tool assembly embodying a further modified form of the invention, parts being shown broken away.

In FIG. 10 there is shown another modified tool assembly 20ᵇ in which an L-shaped frame 120 carries a handle 121 at its rear end. The frame has a depending section 124 at its forward end. A pipe cutter guard 126 is secured to the underside of the frame 120. This guard carries a rotatable pipe cutter wheel 122. Depending from the guard 126 there is a bar 130 which cooperates with section 124 in carrying a hacksaw blade 128. The blade is tightened in place by a wingnut 80' engaged on shaft 82. The shaft moves axially in a sleeve 84' at the lower end of bar 130.

A rail 132 is secured to the underside of the frame 120 to the rear of the pipe cutter wheel 122. On this rail there are engaged legs 92' of an anvil 90' similar to the legs 92 and anvil 90 of tool assembly 20ª. Bolt 99' is threaded in a block 134 set in handle 121. The forward end of the bolt is rotatably engaged by pin 123 in anvil extension 100'. When the bolt is rotated the legs 92' slide along the rail 132 while the anvil moves toward or away from the cutter wheel 122. When the bolt is tightened against a pipe PP' and the tool assembly is rotated while the pipe is held stationary, the pipe will be transversely cut by wheel 122.

While I have illustrated and described the preferred embodiments of my invention, it is to be understood that I do not limit myself to the precise constructions herein disclosed and that various changes and modifications may be made within the scope of the invention as defined in the appended claim.

What is claimed is:

A combination hand tool assembly including a rectangular solid metal body with an integral pistol grip handle depending angularly from one end thereof, said body having a flat top above the handle, with grooves along both sides of the flat top, an integral upright plate at the end of the flat top, said plate having a central slot intersecting the top end edge thereof, an integral bulbous housing on the outer surface of the plate extending thereabove, a shaft on the top of the plate extending across the slot, a cutting wheel rotatably mounted on the shaft, said wheel projecting into the housing and outwardly of the plate, a yoke slidably mounted in the grooves at the top of the body, said yoke having a downwardly extending bight portion at the rear end thereof, a longitudinally extending threaded bore in said bight portion, a bridge member carried on the forward end of the yoke, a V- shaped anvil carried on the forward end of the yoke, said anvil facing said wheel, and an elongated threaded bolt threaded through said bore with the forward end thereof journalled in a hole in the rear end of said body, said bolt coacting with the yoke and body for moving the anvil toward and away from the cutting wheel.

References Cited by the Examiner

UNITED STATES PATENTS

| | | | |
|---|---|---|---|
| 994,477 | 6/11 | Parpart | 10—149 |
| 1,393,380 | 10/21 | Knight | 10—123 |
| 1,512,183 | 10/24 | Miller | 10—149 |
| 1,902,909 | 3/33 | Wheeler | 10—123 |
| 2,130,934 | 9/38 | Thewes | 30—102 |
| 2,615,516 | 10/52 | Hyde | 30—96 X |
| 2,753,744 | 7/56 | Therien | 30—102 |
| 2,773,528 | 12/56 | Gringer | 145—31 |
| 2,778,395 | 1/57 | Forsberg | 145—31 |
| 2,814,867 | 12/57 | Charles | 30—94 |
| 3,013,335 | 12/61 | Kowal | 30—94 |

WILLIAM FELDMAN, *Primary Examiner.*

MILTON S. MEHR, *Examiner.*